(12) United States Patent
Zhang et al.

(10) Patent No.: US 10,921,990 B2
(45) Date of Patent: Feb. 16, 2021

(54) METHOD, ELECTRONIC DEVICE AND COMPUTER PROGRAM PRODUCT FOR STORAGE

(71) Applicant: EMC IP Holding Company LLC, Hopkinton, MA (US)

(72) Inventors: Yang Zhang, Chengdu (CN); Hao Wang, Chengdu (CN); Jiang Tan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/572,934

(22) Filed: Sep. 17, 2019

(65) Prior Publication Data
US 2020/0133513 A1     Apr. 30, 2020

(30) Foreign Application Priority Data
Oct. 29, 2018   (CN) .......................... 2018 1 1270923

(51) Int. Cl.
*G06F 12/00*     (2006.01)
*G06F 3/06*      (2006.01)
*G06F 12/02*     (2006.01)

(52) U.S. Cl.
CPC .......... *G06F 3/0616* (2013.01); *G06F 3/0649* (2013.01); *G06F 3/0653* (2013.01); *G06F 3/0679* (2013.01); *G06F 12/0246* (2013.01); *G06F 2212/7204* (2013.01)

(58) Field of Classification Search
CPC .... G06F 3/0616; G06F 3/0649; G06F 3/0653; G06F 3/0679; G06F 12/0246; G06F 2212/72; G06F 2212/7204
See application file for complete search history.

(56) References Cited

U.S. PATENT DOCUMENTS

| | | | |
|---|---|---|---|
| 7,865,761 B1 | 1/2011 | Chilton | |
| 8,191,084 B1 | 5/2012 | Todd et al. | |
| 8,782,784 B1 | 7/2014 | Bruskin | |
| 9,482,464 B1 | 11/2016 | Burke | |
| 9,690,937 B1 | 6/2017 | Duchin et al. | |
| 9,886,338 B1 | 2/2018 | Khokhar et al. | |
| 10,235,286 B1 | 3/2019 | Yu et al. | |
| 10,545,668 B2 | 1/2020 | Feng et al. | |
| 10,809,922 B2 | 10/2020 | Zhang et al. | |
| 2013/0205070 A1* | 8/2013 | Koseki | G06F 3/0608 711/103 |
| 2017/0315753 A1* | 11/2017 | Blount | G06F 3/0649 |

* cited by examiner

*Primary Examiner* — Shawn X Gu (74) *Attorney, Agent, or Firm* — BainwoodHuang (57) ABSTRACT

Techniques involve determining a first remaining lifetime of a flash device at a first time based on a warranty period, a factor of the number of writes per unit of time, and the number of executed writes for the flash device. The techniques further involve obtaining a second remaining lifetime at a second time prior to the first time, the second remaining lifetime being determined at the second time based on the warranty period, the factor of the number of writes per unit of time, and the number of executed writes. The techniques further involve determining a first lifetime decay rate based on the first and second remaining lifetimes. In addition, the techniques may determine a first predicted remaining lifetime based on the first lifetime decay rate. Accordingly, a remaining lifetime can be predicted based on the usage trend thereof.

17 Claims, 3 Drawing Sheets

METHOD, ELECTRONIC DEVICE AND COMPUTER PROGRAM PRODUCT FOR STORAGE

CROSS-REFERENCE TO RELATED APPLICATION(S)

This application claims priority to Chinese Patent Application No. CN201811270923.3, on file at the China National Intellectual Property Administration (CNIPA), having a filing date of Oct. 29, 2018, and having "METHOD, ELECTRONIC DEVICE AND COMPUTER PROGRAM PRODUCT FOR STORAGE" as a title, the contents and teachings of which are herein incorporated by reference in their entirety.

FIELD

Embodiments of the present disclosure generally relate to a storage system, and more specifically, to a method, electronic device and computer program product for storage.

BACKGROUND

It is well-known that a flash device has a limited service life. Having been subjected to a particular number of erase and write operations, the flash device probably fails. The flash device failure may incur data loss or time-consuming rebuilding for the failed flash device. Therefore, in order to avoid data loss and time-consuming rebuilding, it is desired to be able to determine a remaining lifetime of a flash device, allowing an administrator to replace the flash device before the flash device fails.

SUMMARY

Embodiments of the present disclosure provide a method, electronic device and computer program product for storage.

In a first aspect of the present disclosure, there is provided a method for storage. The method includes determining a first remaining lifetime of a flash device at a first time point based on a warranty period, a factor of the number of writes per unit of time, and the number of executed writes for the flash device. The method further includes obtaining a second remaining lifetime of the flash device at a second time point prior to the first time point, the second remaining lifetime being determined at the second time point based on the warranty period, the factor of the number of writes per unit of time, and the number of executed writes. The method further includes determining a first lifetime decay rate of the flash device based on the first and second remaining lifetimes. In addition, the method may further determine a first predicted remaining lifetime of the flash device based on the first lifetime decay rate.

In a second aspect of the present disclosure, there is provided an electronic device. The electronic device includes at least one processing unit and at least one memory coupled to the at least one processing unit and storing instructions executable by the at least one processing unit. The instructions, when executed by the at least one processing unit, cause the electronic device to perform acts of: determining a first remaining lifetime of a flash device at a first time point based on a warranty period, a factor of the number of writes per unit of time, and the number of executed writes for the flash device; obtaining a second remaining lifetime of the flash device at a second time point prior to the first time point, the second remaining lifetime being determined at the second time point based on the warranty period, the factor of the number of writes per unit of time, and the number of executed writes; determining a first lifetime decay rate of the flash device based on the first and second remaining lifetimes; and determining a first predicted remaining lifetime of the flash device based on the first lifetime decay rate.

In a third aspect of the present disclosure, there is provided a computer program product being tangibly stored on a non-transient computer readable medium and including machine executable instructions which, when executed, cause a machine to perform any steps of the method described according to the first aspect of the present disclosure.

This Summary is provided to introduce a selection of concepts that are further described below in the Detailed Description in a simplified form. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent from more detailed description of some embodiments of the present disclosure with reference to the accompanying drawings, in which the same reference symbols are used to indicate the same elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "comprise" and its variations used in the present disclosure mean including in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

It is well-known that a flash device has a limited service life. Having been subjected to a particular number of erase and write operations, the flash device probably fails. To be specific, a storage medium of a flash device has individually erasable segments, each of which can be put through a limited number of erase cycles before becoming unreliable. An unreliable segment may lead to a flash device failure. In order to avoid the flash device failure resulting from unreliability of a single segment, wear leveling techniques are implemented to help reduce premature failure of a single segment of the flash device. The wear leveling techniques ensure that the flash device can work for the longest possible time but no less than a warranty period, with zero service events due to wearing out. The current wear leveling techniques in industry are almost transparent to a user, in which only end of life (EOL) information of the flash device is provided.

Failure of multiple flash devices may cause data loss in Redundant Array of Independent Disks (RAID) groups. Assumed that only a single flash device fails, it will take a lot of time (hours, or even days) to rebuild the single flash device failed, which depends on storage capacity of the single flash device. Therefore, in order to avoid data loss and time-consuming rebuilding, it is desired to be able to determine a remaining lifetime of the flash device, allowing an administrator to replace the flash device before the flash device fails.

Figure 1:
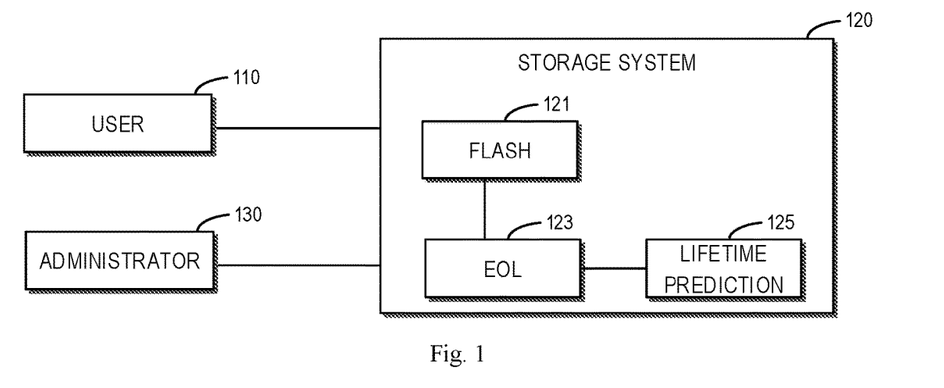
FIG. 1 illustrates a schematic diagram of an example environment for storage.

FIG. 1 illustrates a schematic diagram of an example environment 100 for storage. It would be appreciated that the structure and function of the example environment 100 are depicted only for the purpose of illustration without suggesting any limitation to the scope of the present disclosure. Embodiments of the present disclosure may be embodied in different structures and/or functions.

As shown in FIG. 1, the example environment 100 may include a storage system 120. The storage system 120 may include a flash device 121 for storing data. A user 110 may use the storage system 120. For example, the user 110 may search/query data stored in the storage system 120. In addition, an administrator 130 may be responsible for maintaining the storage system 120. For example, the administrator 130 may replace the flash device 121 before the lifetime of the flash device 121 ends. In some embodiments, the storage system 120 may be an enterprise storage system and located on a server. In the circumstance, the user 110 may be a terminal user that may only use the service provided by the storage system 120 but is unable to perform replacement of the failed flash device 121. Replacement of the flash device 121 may be only performed by the administrator 130. Alternatively, in a case that the storage system 120 is installed on a terminal device, replacement of the flash device 121 may be performed by the user 110.

The storage system 120 may further include an EOL module 123 which may provide end of life (EOL) information of the flash device 121 to the user 110 or the administrator 130. The EOL information may indicate the remaining lifetime of the flash device 121.

1. The EOL information is obtained by leveraging the remaining average erase count of all the storage medium segments of the flash device 121. Each flash device 121 has some inherent parameters as leaving factory, such as a warranty period and a factor of the number of writes per unit of time. For example, a warranty period of a solid-state memory is usually 5 years. A factor of the number of writes per unit of time is typically expressed as the average number of writes per day (WPD) factor, but the factors of the number of writes per other units of time are possible. For example, the WPD factor of the flash device 121 may be 0.5 WPD, 1 WPD, 25 WPD and the like. A flash device 121 with a 5-year warranty period and 1 WPD indicates that: if write is performed on each storage medium segment of the flash device 121 on average once a day (i.e., a write operation equal to the capacity of the flash device 121 is executed once a day), the flash device 121 may be used for 5 years. As an example, assumed that the flash device 121 has a capacity of 100G, warranty period of 10 days and 2 WPD, and further assumed that 200G data have been written for the flash device 121 since the out-of-factory time (i.e., write has been executed twice), the lifetime of the flash device 121 will be reduced by 1 day. That is, the remaining lifetime indicated by the EOL information will be 9 days. For the EOL information, days usually serve as the unit, but it is to be understood that other units of time, such as hours, are feasible. It would be noted that the above specific numerical values are provided only as an example, without limitation.

Therefore, based on the warranty period, the factor of the number of writes per unit of time and the number of executed writes for the flash device 121, the EOL module 123 may provide the EOL information of the flash device 121. However, as will be described in detail below, the EOL information cannot reflect the usage trend of the flash device 121.

Figure 2:
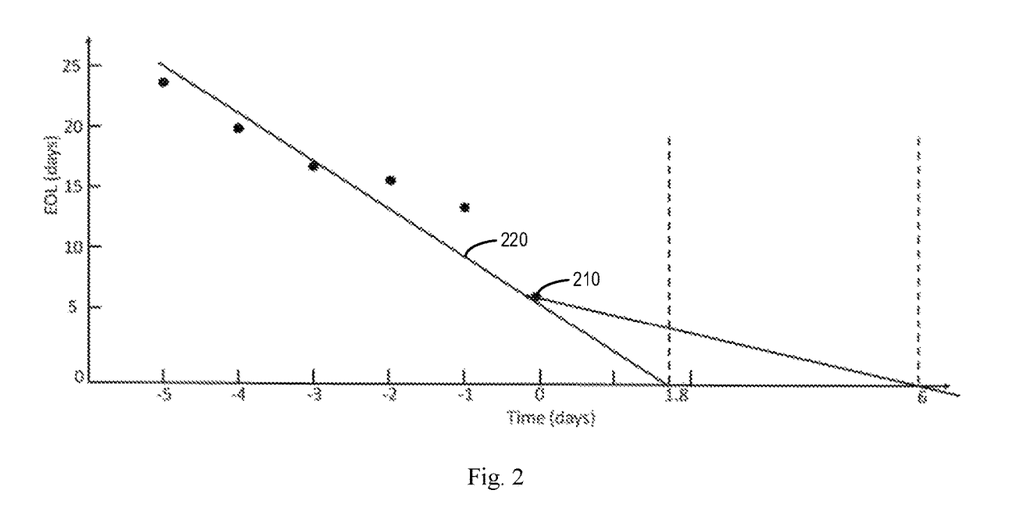
FIG. 2 illustrates remaining lifetimes of a flash device indicated respectively by a current EOL value and several past EOL values.

FIG. 2 illustrates remaining lifetimes of the flash device 121 indicated respectively by a current EOL value and several past EOL values. In FIG. 2, 6 EOL values are indicated with dots, where the current EOL value 210 corresponds to 6 days. The current EOL value 210 indicates that the flash device 121 can be used at least for 6 days until becoming unreliable. However, a simple predicted trend (which is indicated by a straight line 220) for 6 EOL values indicates that the flash device 121 can be used only for 1.8 days, due to a large number of erase and write operations on the flash device 121 in the recent days. It is seen that there is a noticeable difference between the current EOL value per se and the predicted trend based on the EOL values in the past several days.

In other words, the remaining lifetime of the flash device 121 indicated by the current EOL information is not accurate. This is because the current EOL information indicates the remaining lifetime based on the average WPD factor of the flash device 121, but it is unable to reflect wear trend of a higher or lower writing acceleration with respect to the average WPD. The current inaccurate EOL implementation has the following disadvantages. The current inaccurate EOL information may mislead the administrator 130 into planning flash device replacement in improper time. Due to missing an appropriate chance of replacing the flash device, data loss will occur, which is critical to the user 110.

Hence, in order to avoid data unavailability (DU) or data loss (DL), it is important to predict the failure time of the flash device 121 more accurately. The present disclosure proposes a new algorithm for predicting the remaining lifetime of the flash device 121, which may guide the administrator 130 to take an appropriate action at appropriate time.

Returning to FIG. 1, the storage system 120 thus further includes a lifetime prediction module 125 which may predict a remaining lifetime of the flash device 121 based on the EOL information provided by the EOL module 123. Since the wear trend of the flash device 121 is taken into account, the remaining lifetime predicted by the lifetime prediction module 125 is more accurate than the remaining lifetime indicated by the EOL information. The methods or functions described below may be performed by the lifetime prediction module 125.

Figure 3:
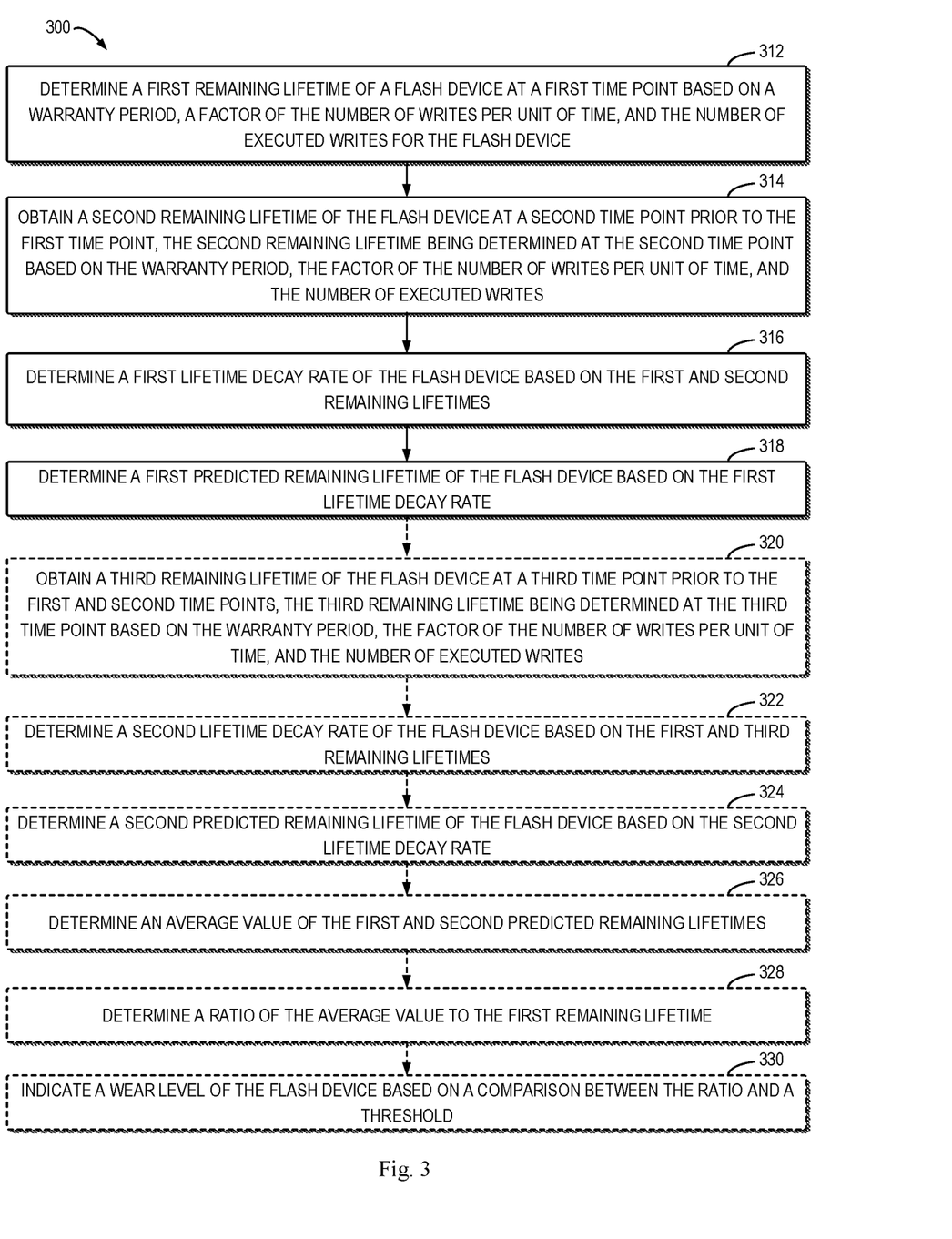
FIG. 3 illustrates a flowchart of a method for storage according to an embodiment of the present disclosure.

FIG. 3 illustrates a flowchart of a method 300 for storage according to an embodiment of the present disclosure. For example, the method 300 may be implemented by the lifetime prediction module 125 as shown in FIG. 1. It is to be appreciated that the method 300 may further include additional blocks not shown and/or omit some blocks as shown. The scope of the present disclosure is not limited in this regard. The dotted blocks as shown in FIG. 3 represent optional steps of the method 300.

At 312, at a first time point, the lifetime prediction module 125 may determine the EOL information (which is also referred to as "a first remaining lifetime $S_0$") of the flash device 121, based on a warranty period, a factor of the number of writes per unit of time (for example, WPD factor) and the number of executed writes for the flash device 121. For example, the first time point may refer to the current time point. The EOL module 123 may update the EOL information of the flash device 121 in a fixed time interval. The calculation method of the EOL information has been described above, which will not be repeated here. The lifetime prediction module 125 may collect the EOL information from the EOL module 123.

At 314, the lifetime prediction module 125 may obtain the EOL information (which is also referred to as "a second remaining lifetime $S_1$") of the flash device 121 at a second time point prior to the first time point. The EOL module 123 may determine the second remaining lifetime $S_1$ at the second time point, based on the warranty period, the factor of the number of writes per unit of time and the number of executed writes. Considering the time interval for determining the EOL information, it would be appreciated that the second remaining lifetime $S_1$ determined at the second time point may be determined at or prior to the second time point. The second remaining lifetime $S_1$ determined by the EOL module 123 may be stored, so as to be called by the lifetime prediction module 125 at a following time point.

Subsequent to obtaining two EOL values (namely, the first and second remaining lifetimes), at block 316, the lifetime prediction module 125 may determine a lifetime decay rate (which is also referred to as "a first lifetime decay rate $R_0$") of the flash device 121, using the first remaining lifetime $S_0$ and the second remaining lifetime $S_1$. The lifetime decay rate may reflect the wear trend/usage trend of the flash device 121.

In some embodiments, the lifetime prediction module 125 may calculate a lifetime difference $S_1-S_0$ between the first and second remaining lifetimes, and calculate a time difference $\Delta t_0$ between the first and second time points. Based on a ratio of the lifetime difference to the time difference, the first lifetime decay rate $R_0$ may be determined. For example, $R_0=(S_1-S_0)/\Delta t_0$.

At 318, the lifetime prediction module 125 may predict the remaining lifetime (which is also referred to as "a first predicted remaining lifetime $E_0$") of the flash device 121, based on the first lifetime decay rate $R_0$. In some embodiments, the first predicted remaining lifetime $E_0$ may be determined by calculating a ratio of the first remaining lifetime $S_0$ at the first time point to the first lifetime decay rate $R_0$. For example, $E_0=S_0/R_0=S_0*\Delta t_0/(S_1-S_0)$. Alternatively, the first predicted remaining lifetime $E_0$ may also be determined by calculating a ratio of the second remaining lifetime $S_1$ at the previous second time point to the first lifetime decay rate $R_0$.

As can be seen from the above description, the algorithm of the present disclosure is simple, involves a few calculation loads, and is easy to implement. Since the input of the lifetime prediction module 125 only includes EOL information, embodiments of the present disclosure will not affect other services on the system. It is a general scheduling algorithm and will not break other operations.

As described above, the current flash device failure notification based on the EOL information will be triggered without considering the wear trend. The high speed of wear ratio may result in a flash device failure far before the EOL, causing DU/DL accordingly. In contrast, embodiments of the present disclosure may prevent the above undesired conditions from happening because the wear trend (which is embodied by the lifetime decay rate) is considered in the lifetime prediction. That is, the remaining lifetime predicted according to embodiments of the present disclosure is more accurate, and the administrator 130 may be notified in time.

In addition, solid-state drive (SSD) is employed for more and more storage systems 120. In the storage industry, SSD is widely used on all flash array (AFA) and hybrid flash array (HFA) due to its high performance. In particular, the algorithm of the present disclosure may be easily implemented on a storage system installed with SSD. However, it would be appreciated that embodiments of the present disclosure may be also applicable to other types of flash devices.

In some embodiments, the lifetime prediction module 125 may compare the first predicted remaining lifetime $E_0$ with a remaining power-on lifetime LL. The remaining power-on lifetime LL may be determined based on the warranty period and a power-on time duration of the flash device 121 prior to the first time point. Even though no erase and write operation is performed for the flash device 121, the lifetime of the flash device 121 is considered to be reduced by one day after being power-on for one day. Therefore, the predicted remaining lifetime should not be greater than the remaining power-on lifetime LL. When the first predicted remaining lifetime $E_0$ is greater than the remaining power-on lifetime LL, the lifetime prediction module 125 sets $E_0$ to LL.

As described above, when determining the first predicted remaining lifetime $E_0$, $S_1-S_0$ is used as the denominator. There may be a case that $S_1-S_0$ is 0 or close to 0. Hence, $E_0$ is huge or meaningless. It means that only little wear or no wear occurs for $\Delta t_0$. In the case, the actual power-on time duration will be considered in the algorithm. The lifetime prediction module 125 sets $E_0$ to the remaining power-on lifetime LL. That is, $E_0$ is equal to a result of subtracting the power-on time duration from the warranty period.

In the above embodiments, only two EOL values are used to determine the lifetime decay rate. As will be described in detail below, more than two EOL values may be used to further improve the algorithm.

Optionally, at 320 in FIG. 3, the lifetime prediction module 125 may further obtain EOL information (which is also referred to as "a third remaining lifetime $S_2$") of the flash device 121 at a third time point, where the third time point is prior to the first and second time points. The EOL module 123 may determine the third remaining lifetime $S_2$ at the third time point based on the warranty period, the WPD factor and the number of executed writes. Considering the time interval for determining the EOL information, it would be appreciated that the third remaining lifetime $S_2$ determined at the third time point may be determined at or prior to the third time point. The third remaining lifetime $S_2$ determined by the EOL module 123 may be stored, so as to be called by the lifetime prediction module 125 at a following time point.

Optionally, at 322, the lifetime prediction module 125 may determine a second lifetime decay rate $R_1$ of the flash device 121 based on the first and third remaining lifetimes. In some embodiments, the lifetime prediction module 125 may calculate a lifetime difference $S_2-S_0$ between the first and third remaining lifetimes, and calculate a time difference $\Delta t_1$ between the first and third time points. Based on a ratio of the lifetime difference to the time difference, the second lifetime decay rate $R_1$ may be determined. For example, $R_1=(S_2-S_0)/\Delta t_1$. It would be appreciated that, in an alternative embodiment, the second lifetime decay rate may also be determined based on the second remaining lifetime $S_1$ and the third remaining lifetime $S_2$.

Optionally, at 324, the lifetime prediction module 125 may determine a second predicted remaining lifetime $E_1$ of the flash device 121, using the second lifetime decay rate $R_1$. In some embodiments, the second predicted remaining lifetime $E_1$ may be determined by calculating a ratio of the first remaining lifetime $S_0$ at the first time point to the second lifetime decay rate $R_1$. For example, $E_1=S_0/R_1=S_0*\Delta t_1/(S_2-S_0)$.

After obtaining two predicted remaining lifetimes, optionally at 326, the lifetime prediction module 125 may calculate an average value Ec of the first predicted remaining lifetime $E_0$ and the second predicted remaining lifetime $E_1$, as a predicted remaining lifetime Ec. For example, $Ec=(E_0+E_1)/2$. In an alternative embodiment, the average value Ec may be a weighted average value. As an example, a weight for the first predicted remaining lifetime $E_0$ may be greater than a weight of the second predicted remaining lifetime $E_1$. The concept of the example lies in that a greater weight is provided to the recent lifetime decay rate than the weight provided to the preceding lifetime decay rate, because the recent lifetime decay rate may be more valuable for lifetime prediction.

Optionally, at 328, the lifetime prediction module 125 may calculate a ratio Fc (which is also referred to as "an adjustment factor Fc") of the average value Ec of predicted remaining lifetimes to the first remaining lifetime $S_0$ (for example, the current EOL value). For example, the ratio $Fc=Ec/S_0$.

Optionally, at 330, the lifetime prediction module 125 may compare the ratio Fc with one or more thresholds, and indicate a wear level of the flash device 121 based on the comparison. The one or more thresholds may be used to indicate different wear levels. For example, when the ratio Fc is less than a threshold indicating a critical wear level, an alarm may be raised to a user, so as to allow the user to take an action.

The above embodiments illustrate a case of three EOL values (which are also referred to as "remaining lifetimes"). However, it would be appreciated that the algorithm of the present disclosure may be easily extended to a case of more than three EOL values. A more general example will be given below.

Figure 4:
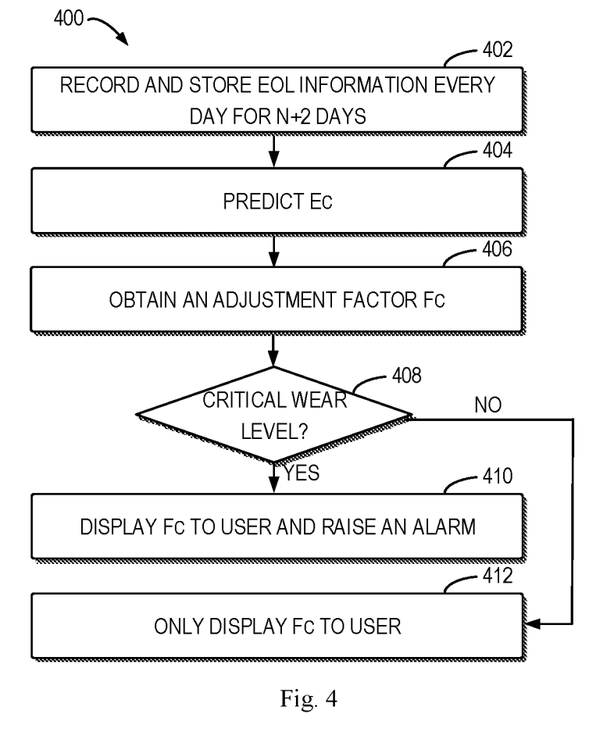
FIG. 4 illustrates a flowchart of a further method for storage according to an embodiment of the present disclosure.

FIG. 4 illustrates a flowchart of a further method 400 for storage according to an embodiment of the present disclosure. For example, the method 400 may be implemented by the lifetime prediction module 125 as shown in FIG. 1. It is to be appreciated that the method 400 may further include additional blocks not shown and/or omit some blocks as shown. The scope of the present disclosure is not limited in this regard.

At 402, after a lifetime prediction and warning policy of the flash device 121 is enabled, the lifetime prediction module 125 may record and store every day the EOL information provided by the EOL module 123. The EOL information may be recorded and stored continuously for N+2 days, where N≥0. For example, the lifetime prediction module 125 may sample the EOL information once a day, at a fixed time point specified by a user, and store the sampled EOL information for subsequent use. It would be noted that although the EOL information is stored once a day in the above embodiment, in other embodiments, other units of time, such as hours, may be used, or the EOL information may be stored in other time intervals.

At 404, the lifetime prediction module 125 may predict the remaining lifetime Ec based on the N+2 EOL values recorded and stored. Ec is an average value of a plurality of predicted remaining lifetimes Ei. The predicted remaining lifetime Ei may be calculated based on the EOL information of the current day and several days ago. In an embodiment, the predicted remaining lifetime Ei may be calculated through the following equation:

$$E_i = \min\left\{\frac{S_0 \times \Delta t_i}{S_{i+1} - S_0}, LL\right\}_{,i=0,1,\ldots N} \quad (1)$$

where $S_0$ represents the EOL value collected at the last day, and the last day is usually the current day; $S_{i+1}$ represents the EOL value collected i+1 days ago with respect to $S_0$; $\Delta t_i$ represents a time difference between the time point at which $S_0$ is collected and the time point at which $S_{i+1}$ is collected, i.e., $\Delta t_i=i+1$, in which the unit is day; and LL represents a remaining power-on lifetime, and LL=a warranty period (for example, 5 years)−power-on time duration (total power-on time duration since the first power-on).

If the actual number of sampling days EN is fewer than the user specified number of sampling days UN (for example, N+2 days), the algorithm uses the actual number of sampling days EN. That is, N+2=min {UN, EN}. For example, the user specified number of sampling days UN may be 5 days by default. If the predicted remaining lifetime Ei is calculated using the equation (1), it is required to collect at least two EOL values. In the case that the actual number of sampling days EN is 1, the average value Ec may be set to the current EOL value $S_0$.

After Ei is obtained, the average value Ec may be calculated through the following equation:

$$E_c = \frac{E_0 \times W_N + E_1 \times W_{N-1} \ldots E_N \times W_0}{\sum_{i=0}^{N} W_i} \quad (2)$$

Wherein, Wi is the weight for each predicted remaining lifetime Ei.

In embodiments of the present disclosure, the recent wear trend will be assigned with a greater weight, while a preceding wear trend will be assigned with a smaller weight. Therefore, the weight $W_N$ for $E_0$ is the maximum. For example, the weight Wi may use arithmetic progression or Fibonacci sequence. Only as an example, without limitation, $W_i = W_{i-1} + i(W_0 = 1)$.

At 406, after the predicted remaining lifetime Ec is obtained, the lifetime prediction module 125 may calculate an adjustment factor Fc for indicating a wear level through the following equation:

$$F_C = \frac{E_c}{S_0} = \frac{\frac{E_0 \times W_N + E_1 \times W_{N-1} \ldots E_N \times W_0}{\sum_{i=0}^{N} W_i}}{S_0} \quad (3)$$

At 408, the lifetime prediction module 125 may determine whether a critical wear level appears. For example, Fc<0.6 may indicate the critical wear level, which means that the predicted lifetime is far less than the EOL information. It would be noted that the specific numerical values are provided only as an example, without limitation.

If the critical wear level appears, at 410, the lifetime prediction module 125 may report or display Fc to the user 110 or the administrator 130, and raise an alarm to the user 110 or the administrator 130, to notify the user 110 or the administrator 130 to pay attention.

If the critical wear level does not appear, at 412, the lifetime prediction module 125 may only report or display Fc to the user 110 or the administrator 130, without raising a notification or alarm. 0.6≤Fc≤0.9 indicates a high wear level, which means that the wear of the flash device 121 is serious, and the predicted lifetime is less than the EOL information; 0.9<Fc≤1.1 indicates a medium wear level, which means that the predicted lifetime is nearly the same as the EOL information; and Fc>1.1 indicates a low wear level, which means that the wear of the flash device 121 is minor, and the predicted lifetime is greater than the EOL information. All of the above wear levels belong to the condition that the critical wear level does not appear. It would be noted that the above specific numerical values are provided only as an example, without limitation.

In practice, for each flash device 121 in the storage system 120, the lifetime prediction module 125 may calculate the predicted remaining lifetime Ec and the adjustment factor Fc every day, and give a corresponding report or alarm.

Tables 1 to 3 below will demonstrate three examples to illustrate different wear levels, where all the number of sampling days is N+2=7 days (N=5), and the EOL information is collected once a day. Table 1 illustrates an example of a low wear level. In Table 1, the current EOL information is 39 hours (39/24=1.625 days). As shown in Table 1, according to the algorithm of the present disclosure, Ec=16.46, and Fc=16.46/(39/24)=10.12. Fc>1.1 (a low wear level). In this case, Ec(16.46)>EOL(1.625), which indicates a low wear level. That is, the estimated remaining lifetime is 16.46 days.

TABLE 1

Example of a low wear level

| | Day No. | | | | | | |
|---|---|---|---|---|---|---|---|
| | −6 | −5 | −4 | −3 | −2 | −1 | 0 (current day) |
| EOL (hours) | 62 | 53 | 49 | 48 | 44 | 41 | 39 |
| Wi | | 1 | 2 | 4 | 7 | 11 | 16 |
| Ei (days) | | 10.2 | 13.9 | 15.6 | 13 | 15.6 | 19.5 |
| Ec (days) | | | | | | | 16.46 |

Table 2 illustrates an example of a medium wear level. In Table 2, the current EOL information is 390 hours (390/24=16.25 days). As shown in Table 2, according to the algorithm of the present disclosure, Ec=16.46, Fc=16.46/(390/24)=1.01, and 0.9<Fc≤1.1. In this case, Ec(16.46) and EOL(16.25) are nearly the same, which indicates a medium wear level.

TABLE 2

Example of a medium wear level

| | Day No. | | | | | | |
|---|---|---|---|---|---|---|---|
| | −6 | −5 | −4 | −3 | −2 | −1 | 0 (current day) |
| EOL (hours) | 620 | 530 | 490 | 480 | 440 | 410 | 390 |
| Wi | | 1 | 2 | 4 | 7 | 11 | 16 |
| Ei (days) | | 10.2 | 13.9 | 15.6 | 13 | 15.6 | 19.5 |
| Ec (days) | | | | | | | 16.46 |

Table 3 illustrates an example of a critical wear level. In Table 3, the current EOL information is 3900 hours (3900/24=162.5 days). As shown in Table 3, according to the algorithm of the present disclosure, Ec=16.46, Fc=16.46/(3900/24)=0.1, and Fc<0.6. In this case, Ec(16.46)<EOL (162.5), which indicates a critical wear level. The EOL information indicates that hundreds or thousands of service hours will be exhausted every day, and the lifetime decay is very fast. The alarm will be triggered to notify the user to take an action for a potential flash failure.

TABLE 3

Example of a critical wear level

| | Day No. | | | | | | |
|---|---|---|---|---|---|---|---|
| | −6 | −5 | −4 | −3 | −2 | −1 | 0 (current day) |
| EOL (hours) | 6200 | 5300 | 4900 | 4800 | 4400 | 4100 | 3900 |
| Wi | | 1 | 2 | 4 | 7 | 11 | 16 |
| Ei (days) | | 10.2 | 13.9 | 15.6 | 13 | 15.6 | 19.5 |
| Ec (days) | | | | | | | 16.46 |

Figure 5:
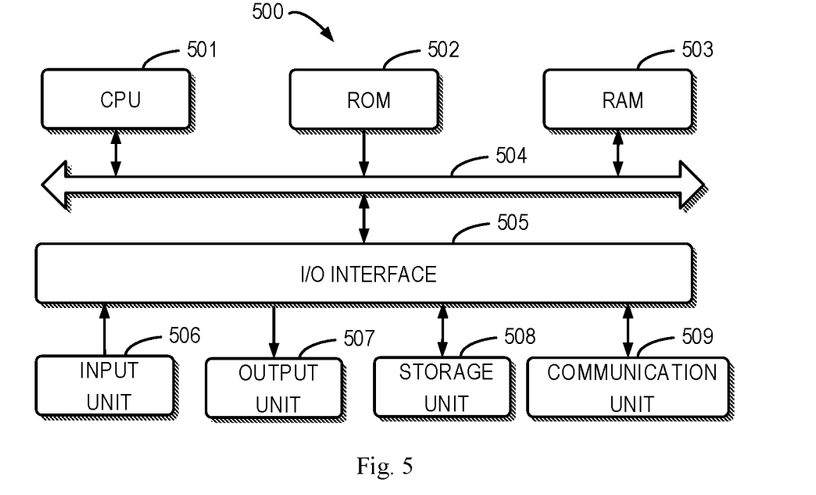
FIG. 5 illustrates a schematic block diagram of an example device that may be used to implement embodiments of the present disclosure.

FIG. 5 illustrates a schematic block diagram of an example device 500 that may be used to implement embodiments of the present disclosure. Both the EOL module 123 and the lifetime prediction module 125 as shown in FIG. 1 may be implemented by the example device 500, specifically, by a processing unit 501 of the example device 500.

As indicated, the device 500 includes a central processing unit (CPU) 501 which can perform various appropriate actions and processes based on computer program instructions stored in a read-only memory (ROM) 502 or computer program instructions loaded from a storage unit 508 into a random access memory (RAM) 503. In RAM 503, there are also stored various programs and data required by the device 500 when operating. The CPU 501, ROM 502 and RAM 503 are connected to one another via a bus 504. An input/output (I/O) interface 505 is also connected to the bus 504.

A plurality of components of the device 500 are connected to the I/O interface 505, including: an input unit 506 including a keyboard, a mouse, and the like; an output unit 507, such as various types of displays, loudspeakers, and the like; a storage unit 508 including a magnetic disk, an optical disk, and the like; and a communication unit 509 including a LAN card, a modem, a wireless communication transceiver and so on. The communication unit 509 allows the device 500 to exchange information/data with other devices via a computer network, such as the Internet, and/or various telecommunications networks.

The above-described procedures and processes, such as the methods 300 and 400, can be implemented by the processing unit 501. For example, in some embodiments, the methods 300 and 400 can be implemented as a computer software program which is tangibly embodied on a machine readable medium, for instance, the storage unit 508. In some embodiments, part or all of the computer program can be loaded to and/or installed on the device 500 via the ROM 502 and/or the communication unit 509. The computer program, when loaded to the RAM 503 and executed by the CPU 501, may execute one or more acts of the methods 300 and 400 as described above. Alternatively, the CPU 501 can also be configured to implement the methods 300 and 400 as described above in any other proper manner (for example, by means of firmware).

To sum up, the present disclosure provides an improved algorithm for a remaining lifetime prediction and warning policy of a flash device. The algorithm predicts a remaining lifetime of a flash device based on the existing EOL information, without requiring other additional information. Hence, embodiments of the present disclosure can be easily implemented, without influencing other operations of the system. In comparison with the EOL information, the predicted result is more accurate, since a lifetime decay rate is taken into account. The algorithm can also estimate a wear level of a flash device and notify an administrator to take an action at appropriate time. Accurate lifetime prediction and the wear level will work together to guide an administrator for the flash replacement at appropriate time, thereby avoiding an unnecessary flash failure that causes DU or DL.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (or specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for storage, comprising:
    determining a first remaining lifetime of a flash device at a first time point based on a warranty period, a factor of a number of writes per unit of time, and a number of executed writes for the flash device;
    obtaining a second remaining lifetime of the flash device at a second time point prior to the first time point, the second remaining lifetime being determined at the second time point based on the warranty period, the factor of the number of writes per unit of time, and the number of executed writes;
    determining a first lifetime decay rate of the flash device based on the first and second remaining lifetimes; and
    determining a first predicted remaining lifetime of the flash device based on the first lifetime decay rate.

2. The method of claim 1, further comprising:
    obtaining a third remaining lifetime of the flash device at a third time point prior to the first and second time points, the third remaining lifetime being determined at the third time point based on the warranty period, the factor of the number of writes per unit of time, and the number of executed writes;
    determining a second lifetime decay rate of the flash device based on the first and third remaining lifetimes;
    determining a second predicted remaining lifetime of the flash device based on the second lifetime decay rate; and
    determining an average value of the first and second predicted remaining lifetimes.

3. The method of claim 2, wherein the average value is a weighted average value of the first and second predicted remaining lifetimes, and wherein a first weight for the first predicted remaining lifetime is greater than a second weight for the second predicted remaining lifetime.

4. The method of claim 2, further comprising:
    determining a ratio of the average value to the first remaining lifetime; and
    indicating a wear level of the flash device based on a comparison between the ratio and a threshold.

5. The method of claim 1, further comprising:
    determining a remaining power-on lifetime of the flash device based on the warranty period and a power-on time duration of the flash device prior to the first time point; and
    in response to the first predicted remaining lifetime being greater than the remaining power-on lifetime, setting the first predicted remaining lifetime to the remaining power-on lifetime.

6. The method of claim 1, further comprising:
    determining a remaining power-on lifetime of the flash device based on the warranty period and a power-on time duration of the flash device prior to the first time point; and
    in response to the first remaining lifetime being equal to the second remaining lifetime, setting the first predicted remaining lifetime to the remaining power-on lifetime.

7. The method of claim 1, wherein determining a first lifetime decay rate of the flash device comprises:
    determining a lifetime difference between the first and second remaining lifetimes;
    determining a time difference between the first and second time points; and
    determining the first lifetime decay rate based on a ratio of the lifetime difference to the time difference.

8. The method of claim 1, wherein determining a first predicted remaining lifetime of the flash device based on the first lifetime decay rate comprises:
    determining the first predicted remaining lifetime based on a ratio of the first remaining lifetime to the first lifetime decay rate.

9. An electronic device, comprising:
    at least one processing unit;
    at least one memory coupled to the at least one processing unit and storing instructions executable by the at least one processing unit, the instructions, when executed by the at least one processing unit, causing the electronic device to perform acts of:

determining a first remaining lifetime of a flash device at a first time point based on a warranty period, a factor of a number of writes per unit of time, and a number of executed writes for the flash device;

obtaining a second remaining lifetime of the flash device at a second time point prior to the first time point, the second remaining lifetime being determined at the second time point based on the warranty period, the factor of the number of writes per unit of time, and the number of executed writes;

determining a first lifetime decay rate of the flash device based on the first and second remaining lifetimes; and determining a first predicted remaining lifetime of the flash device based on the first lifetime decay rate.

10. The electronic device of claim 9, wherein the instructions, when executed by the at least one processing unit, further cause the electronic device to perform acts of:

obtaining a third remaining lifetime of the flash device at a third time point prior to the first and second time points, the third remaining lifetime being determined at the third time point based on the warranty period, the factor of the number of writes per unit of time, and the number of executed writes;

determining a second lifetime decay rate of the flash device based on the first and third remaining lifetimes;

determining a second predicted remaining lifetime of the flash device based on the second lifetime decay rate; and determining an average value of the first and second predicted remaining lifetimes.

11. The electronic device of claim 10, wherein the average value is a weighted average value of the first and second predicted remaining lifetimes, and wherein a first weight for the first predicted remaining lifetime is greater than a second weight for the second predicted remaining lifetime.

12. The electronic device of claim 10, wherein the instructions, when executed by the at least one processing unit, further cause the electronic device to perform acts of:

determining a ratio of the average value to the first remaining lifetime; and indicating a wear level of the flash device based on a comparison between the ratio and a threshold.

13. The electronic device of claim 9, wherein the instructions, when executed by the at least one processing unit, further cause the electronic device to perform acts of:

determining a remaining power-on lifetime of the flash device based on the warranty period and a power-on time duration of the flash device prior to the first time point; and in response to the first predicted remaining lifetime being greater than the remaining power-on lifetime, setting the first predicted remaining lifetime to the remaining power-on lifetime.

14. The electronic device of claim 9, wherein the instructions, when executed by the at least one processing unit, further cause the electronic device to perform acts of:

determining a remaining power-on lifetime of the flash device based on the warranty period and a power-on time duration of the flash device prior to the first time point; and in response to the first remaining lifetime being equal to the second remaining lifetime, setting the first predicted remaining lifetime to the remaining power-on lifetime.

15. The electronic device of claim 9, wherein determining a first lifetime decay rate of the flash device comprises:

determining a lifetime difference between the first and second remaining lifetimes;

determining a time difference between the first and second time points; and determining the first lifetime decay rate based on a ratio of the lifetime difference to the time difference.

16. The electronic device of claim 9, wherein determining a first predicted remaining lifetime of the flash device based on the first lifetime decay rate comprises:

determining the first predicted remaining lifetime based on a ratio of the first remaining lifetime to the first lifetime decay rate.

17. A computer program product having a non-transitory computer readable medium which stores a set of instructions that, when carried out by computerized circuitry, causes the computerized circuitry to perform a method of:

determining a first remaining lifetime of a flash device at a first time point based on a warranty period, a factor of a number of writes per unit of time, and a number of executed writes for the flash device;

obtaining a second remaining lifetime of the flash device at a second time point prior to the first time point, the second remaining lifetime being determined at the second time point based on the warranty period, the factor of the number of writes per unit of time, and the number of executed writes;

determining a first lifetime decay rate of the flash device based on the first and second remaining lifetimes; and determining a first predicted remaining lifetime of the flash device based on the first lifetime decay rate.

* * * * *